US012665929B2

(12) United States Patent
Schmugar et al.

(10) Patent No.: US 12,665,929 B2
(45) Date of Patent: Jun. 23, 2026

(54) CONTEXTUAL DATA SECURITY

(71) Applicant: McAfee, LLC, San Jose, CA (US)

(72) Inventors: Craig Schmugar, Beaverton, OR (US); David Allen Marcus, Davidsonville, MD (US); Erwin R. Corpuz, Chantilly, VA (US); Matthew J. Hodyno, Silver Spring, MD (US); Jonathan Lee Prather, South Riding, VA (US)

(73) Assignee: McAfee, LLC, San Jose, CA (US)

( * ) Notice: Subject to any disclaimer, the term of this patent is extended or adjusted under 35 U.S.C. 154(b) by 315 days.

(21) Appl. No.: 17/079,841

(22) Filed: Oct. 26, 2020

(65) Prior Publication Data

US 2022/0131896 A1     Apr. 28, 2022

(51) Int. Cl.
| | |
|---|---|
| *H04L 9/40* | (2022.01) |
| *G06N 3/04* | (2023.01) |
| *H04L 51/212* | (2022.01) |
| *H04L 67/306* | (2022.01) |
| *H04L 67/50* | (2022.01) |

(52) U.S. Cl.
CPC ........... *H04L 63/1483* (2013.01); *G06N 3/04* (2013.01); *H04L 51/212* (2022.05); *H04L 63/10* (2013.01); *H04L 63/104* (2013.01); *H04L 63/1433* (2013.01); *H04L 67/306* (2013.01); *H04L 67/535* (2022.05)

(58) Field of Classification Search
CPC ..... H04L 63/1483; H04L 51/12; H04L 63/10; H04L 63/104; H04L 63/1433; H04L 67/22; H04L 67/306; G06N 3/04
See application file for complete search history.

(56) References Cited

U.S. PATENT DOCUMENTS

| | | | | |
|---|---|---|---|---|
| 7,552,185 B1 * | 6/2009 | Kirzner | ................ | G06Q 10/107 |
| | | | | 715/752 |
| 7,810,160 B2 * | 10/2010 | Dougherty | ............ | H04L 67/306 |
| | | | | 713/166 |
| 9,141,940 B2 * | 9/2015 | Pocklington | ............ | H04L 51/23 |
| 9,530,119 B1 * | 12/2016 | Grisso | .................. | H04L 51/212 |
| 10,171,403 B2 * | 1/2019 | Ashoori | ................. | H04L 51/18 |
| 10,666,676 B1 * | 5/2020 | Hsu | ......................... | H04L 51/12 |
| 10,762,895 B2 * | 9/2020 | Togwe | .................... | G10L 15/26 |
| 2006/0123080 A1 * | 6/2006 | Baudino | ............... | H04L 67/306 |
| | | | | 709/204 |
| 2007/0156886 A1 * | 7/2007 | Srivastava | .............. | H04L 51/12 |
| | | | | 709/224 |

(Continued)

*Primary Examiner* — Ramy M Osman
(74) *Attorney, Agent, or Firm* — PATENT CAPITAL GROUP

(57) ABSTRACT

There is disclosed in one example a computing apparatus, including: a hardware platform including a processor and a memory; a network interface; a userspace application store including a plurality of userspace applications, wherein at least some of the userspace applications are programmed to communicate via the network interface; and instructions encoded within the memory to: enumerate social connections of a user via the userspace applications; assign the social connections to virtual groups according, at least in part, to correlated connection services; assign data transfer policies to the virtual groups; detect an attempted data transfer to a social connection; and enforce the data transfer policy for a virtual group of the social connection of the attempted data transfer.

20 Claims, 16 Drawing Sheets

(56) References Cited

U.S. PATENT DOCUMENTS

2007/0294428 A1*  12/2007  Guy ..................... G06Q 10/107
                                                      709/245
2008/0052272 A1*  2/2008  Altaf ..................... G06F 40/232
2008/0114846 A1*  5/2008  Sano ..................... G06Q 10/107
                                                      709/206
2009/0070334 A1   3/2009  Callahan et al.
2009/0292784 A1*  11/2009  Leedberg .............. H04L 51/212
                                                      709/206
2010/0312714 A1   12/2010  Ourega
2011/0078259 A1*  3/2011  Rashad ................... H04L 51/52
                                                      706/54
2011/0119730 A1*  5/2011  Eldar ................. H04L 63/0263
                                                      726/1
2011/0225293 A1   9/2011  Rathod
2012/0290659 A1   11/2012  Rao et al.
2013/0080775 A1*  3/2013  Liebmann .......... H04L 63/0428
                                                      713/168
2013/0124648 A1*  5/2013  Kallayil ................. H04L 51/12
                                                      709/206
2013/0166657 A1*  6/2013  Tadayon ............. G06Q 10/107
                                                      709/206
2014/0108562 A1*  4/2014  Panzer ................... H04L 51/02
                                                      709/204
2014/0181438 A1*  6/2014  Varadharajan ......... G06F 11/00
                                                      711/162

2014/0189027 A1*  7/2014  Zhang .................... H04L 51/02
                                                      709/206
2014/0280152 A1*  9/2014  Jin ......................... G06Q 50/01
                                                      707/737
2014/0280570 A1   9/2014  Sutton et al.
2015/0271281 A1*  9/2015  Sundqvist .............. H04L 43/08
                                                      709/224
2015/0312197 A1*  10/2015  Dong ..................... H04L 51/28
                                                      715/752
2016/0205052 A1*  7/2016  DeLuca ............... H04L 51/212
                                                      709/206
2016/0366088 A1*  12/2016  Abou Mahmoud .... H04L 51/23
2017/0093787 A1*  3/2017  Harihara ................ H04L 51/56
2017/0155611 A1*  6/2017  Ashoori ................ H04L 67/306
2017/0346853 A1*  11/2017  Wyatt ................. H04L 63/1425
2017/0351855 A1*  12/2017  Allen .................... H04L 63/105
2018/0075414 A1*  3/2018  Saito ....................... H04L 51/48
2019/0007231 A1*  1/2019  Tan ........................ H04L 51/02
2019/0068541 A1*  2/2019  Ashoori ................. H04L 63/04
2019/0182197 A1*  6/2019  Saito .................... H04L 51/234
2019/0197479 A1*  6/2019  Huang ................... H04L 51/52
2019/0364001 A1*  11/2019  Dotan-Cohen ...... G06Q 10/107
2020/0042902 A1*  2/2020  Li ............................. G06N 5/04
2020/0151620 A1*  5/2020  Chao ...................... H04L 51/12
2020/0356587 A1*  11/2020  Harijan ................ H04L 51/214
2020/0396190 A1*  12/2020  Pickman ............ H04L 63/1483
2021/0234820 A1*  7/2021  Dhawan ................. H04L 51/08
2021/0374335 A1*  12/2021  Adcock ................. G06F 40/205
2023/0021182 A1*  1/2023  Loi ....................... H04L 51/043

* cited by examiner

CLIENT DEVICE 500

| HARDWARE PLATFORM 504 | NETWORK INTERFACE 508 |
| OPERATING SYSTEM 512 | APPLICATION STORE 516 |
| AI MODULE 520 | SOCIAL CONNECTION MANAGEMENT ENGINE 524 |
| | CONNECTION POLICY STORE 528 |

SECURITY SERVER 600

HARDWARE PLATFORM 604

HOST OPERATING SYSTEM 608

GUEST INFRASTRUCTURE 612

CROWDSOURCING ENGINE 616

REPUTATION ENGINE 620

MACHINE LEARNING ENGINE 624

CLIENT MODEL STORE 628

SoC 900

CORE0 902-1

CORE 1 902-2

L2 CACHE CONTROLLER 904

L2 CACHE 916

BUS INTERFACE UNIT 914

HDMI

MIPI

LCD VIDEO I/F 910

VIDEO CODEC 908

GPU 906

INTERCONNECT 912

SPI DIRECTOR 928

FLASH CONT 924

SDRAM CONT 922

BOOT ROM 920

SIM I/F 918

POWER CONTROLLER 930

FLASH 934

DRAM 932

VIRTUALIZED NETWORK INFRASTRUCTURE 1100

NFV ORCHESTRATOR 1101

HARDWARE PLATFORM 1102-1

VM 1104-1

VNF 1
1112-1

VIRTUAL OS
1108-1

DPDK 1116-1

VM 1104-2

VNF 2
1112-2

VIRTUAL OS
1108-2

DPDK 1116-2

HARDWARE PLATFORM 1102-2

VM 1104-3

VNF 3
1112-3

VIRTUAL OS
1108-3

DPDK 1116-3

VM 1104-4

VNF 4
1112-4

VIRTUAL OS
1108-4

DPDK 1116-4

DISTRIBUTED vSWITCH 1122

HYPERVISOR 1120-1

HYPERVISOR 1120-1

CONTAINERIZATION INFRASTRUCTURE 1200

CONTAINERIZED SERVER 1204

USERSPACE APPLICATIONS 1220

SERVICES 1218

CONTAINERIZATION LAYER 1216

MAIN OPERATING SYSTEM 1212

CONTAINER 1230

USERSPACE APPLICATIONS 1236

SERVICES 1234

MINIMAL OS 1232

CONTAINER 1240

USERSPACE APPLICATIONS 1246

SERVICES 1244

MINIMAL OS 1242

SHARED KERNEL 1208

1400

START

1404
INITIALIZE WEIGHTS AND BIASES (RANDOM)

1408
PROVIDE TRAINING SET

1412
PROPAGATE TRAINING SET THROUGH NEURAL NETWORK

1416
COMPUTE COST FUNCTION

1420
BACK PROPAGATE TO COMPUTE NEGATIVE GRADIENT

NO

1424
LOCAL MINIMUM?

YES

1432
NETWORK READY

1500

START

EXTRACT ACTIVATION VALUES FROM INPUT DATA    1504

PROPAGATE ACTIVATION VALUES TO NEXT LAYER    1508

FOR EACH NEURON IN THIS LAYER, COMPUTE SUM OF WEIGHTED AND BIASED ACTIVATION VALUES    1512

FOR EACH NEURON IN THIS LEVEL, NORMALIZE (0 ≤ a ≤ 1)    1516

NO

LAST LAYER?    1520

YES

CLASSIFY PERCEPTRON(S)    1524

ANALYZER ENGINE 1604

| OPERATING SYSTEM 1608 | GPU ARRAY 1624 |
| PYTHON INTERPRETER 1612 | NEURAL NETWORK 1628 |
| NETWORK INTERFACE 1620 | RESULTS INTERPRETER 1632 |
| | OBJECTS DATABASE 1636 |

CONTEXTUAL DATA SECURITY

FIELD OF THE SPECIFICATION

This application relates in general to computer security, and more particularly, though not exclusively, to a system and method of providing contextual data security.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
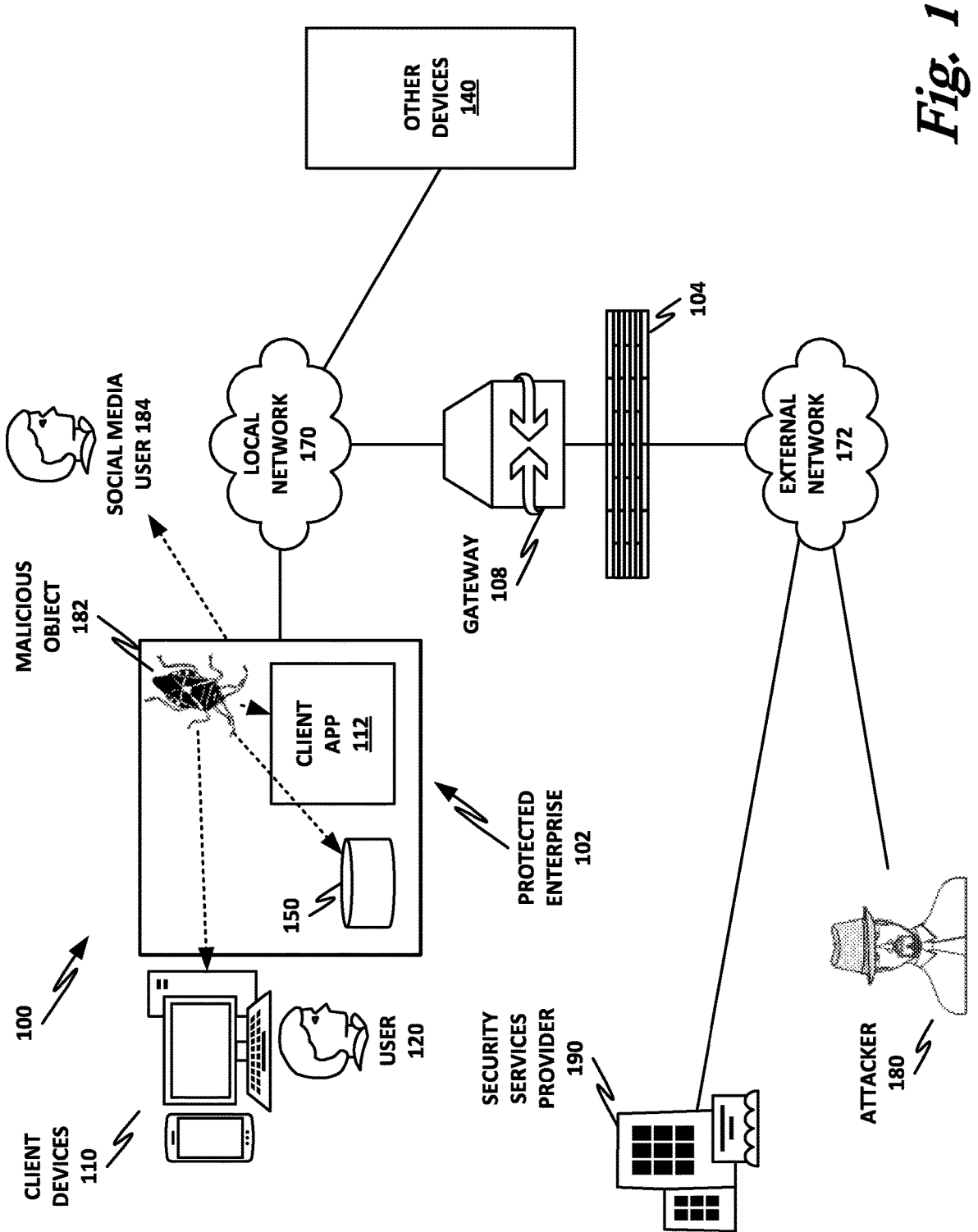
FIG. 1 is a block diagram illustration of selected elements of a security ecosystem.

In an example, there is disclosed a computer-implemented method of providing contextual security for a user, comprising: enumerating a plurality of social connections for the user; building permissible data transfer profiles for a plurality of virtual groups; detecting an attempted data transfer to a social connection; and managing the attempted data transfer according to a permissible data transfer profile for a virtual group associated with the social connection.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Computer security is a significant challenge, in part because a single solution is not applicable to all situations and contexts. This may be especially applicable in a modern world where users might work from anywhere. In a highly constrained office environment, it may be relatively more straightforward to enforce data security protocols, such as by restricting the ability of users to access or share data from endpoints that are tightly controlled by the enterprise. But in a more modern office environment, the user may own his or her own device (a so-called "bring your own device" or BYOD environment), and may access enterprise resources according to certain enterprise policies. The user may use the same device to access other resources, such as gaming sites, social networks, personal work, or other.

Throughout the day, a user may interact with multiple different entities. Thus, each individual may be thought of as belonging to a number of virtual organizations. These virtual organizations could be formally organized organizations, such as clubs, enterprises, consortiums, churches, nonprofits, or similar; or the virtual organizations could be more loosely defined, such as a group of friends, associates, acquaintances, clubs with varying membership, or similar.

An individual user may be thought of as a *nexus* between each of the organizations that she belongs to. For example, a user may be the chief information officer (CIO) of a company, a social media user, and a member of the bake sale committee for her church. In the context of CIO, it may be highly appropriate and even desirable for her to share a detailed technology roadmap for the company with other members of the company's information technology (IT) group. However, it may be undesirable, and in fact forbidden, for her to share that same information with her church's bake sale committee. Similarly, it may be expected and encouraged for her to share her grandmother's banana bread recipe with the bake sale committee, while it would be unusual (but not forbidden) for her to share that recipe with the company's IT group.

Because the user is a member of multiple communities, there may be certain norms associated with each community. For example, one community may regularly share photos, while the other may conduct business transactions. Receiving a photo of a family pet is expected among members of one of these communities, while sharing a vendor invoice may not be expected for that community.

Implementing a just-in-context (JIC) security policy, or in other words a contextual security policy, may include enumerating the user's connections, classifying those connections, and classifying the types of data that are appropriately shared across connections. However, manually defining connection classes, as well as manually defining appropriate contextual data sharing for each class, may be a difficult task.

Thus, it may be desirable to use an automated process, such as machine learning, to analyze connections, analyze data shared among connections, extract features from those data points, and automatically "learn" the appropriate categories or classes for connections and datatypes. A machine learning system can then craft a policy that looks for data transfers across connections, and determine whether the data transfer is an exception to the policy. When an exception to the policy occurs, the system may take an appropriate action, depending for example on the severity of the exception, the type of information shared, the type of communication, and other contextual data. For example, sharing a banana bread recipe with the IT department may be an exception to the normal policy, but may be of relatively low priority, because it represents a low probability of a data leak or a security infraction.

On the other hand, sharing a technology plan with the bake sale committee may be a relatively severe security problem, and may require more aggressive action. Note that determining the features of the data shared could include examining the content of the data itself, and may also include metadata or other features. For example, within an industry consortium, it may be expected to share certain enterprise data across the consortium. However, it may be more common to share the enterprise data in a static format such as portable document format (PDF) or a tagged image file (TIF), rather than in a native electronic format such as a Microsoft Office document, or other native binary data.

The system and method disclosed herein realize advantages over existing solutions that rely on single-organizational controls. These solutions tend to be diminished to the lowest common denominator. Even where platforms are designed with multiple personas in mind, applications may exist in security silos that have little contextual awareness. For example, from a security perspective, an e-mail client may be treated simply as an e-mail client. It may allow, block, and/or warn on content based on enterprise-wide or client-wide policies. Where a system lacks dynamic discovery of typical behaviors in group interactions, the security context may be incomplete.

The system disclosed herein may implement, for example, an algorithm that dynamically clusters users into virtual organizations and applies corresponding security policies. For discussion purposes, this algorithm may be divided into the following five major operations:

In the first operation, the system takes an inventory. This may include identifying the current user, and/or identifying interactions between the current user and people, places, organizations, and/or enterprises.

Second, the system builds a model. The model may cluster interactions from the first operation, and may also account for outliers.

Third, the system may leverage a cloud-based system. The cloud-based system may build on locally-derived models (e.g., those derived from the previous two operations), and provide "spiderweb" interactions. This may be treated as a model of models, or a metamodel.

Fourth, the system may monitor for new interactions.

Fifth, when a new interaction is triggered, the system may check the interaction against the expected interactions within the model, and determine whether the interaction crosses a designated threshold for deviation. If the interaction deviates, then appropriate action may be taken.

Advantageously, this does not require designating categories of users, networks, interactions, and/or data in advance. Rather, a machine learning algorithm is well suited for the task of extracting features and building these classes or categories on its own, and looking for actions that deviate from the "norm."

The system may provide clustering of user interactions across different communities to discover virtual organizations. It may also cluster user interactions across different communities to discover accepted sharing practices within the virtual organizations. Furthermore, the system may build a security-focused model from clustering user interactions across different communities for the purpose of applying dynamically-derived acceptable use policies. Advantageously, the system does not rely on predefined policies of organizations and/or communities. Nor does it necessarily require an administrator to predefine memberships within various organizations or communities.

However, it does not exclude such manual interactions. For example, a training site could include pre-existing categories of connections, data, or other similar features that can be used to initially train the model. However, the system also accommodates rapid context switching without additional burden on the user or an administrator. Over time, it can learn and categorize networks, connections, interactions, and data transfers that go beyond what was originally conceived by the training data set, if it is provided.

An advantage of clustering user interactions is the ability to create "snapshots" at the time of an activity or connection. This allows for the identification of changes in regularly occurring activities, or the interjection of foreign influence. If a user's connections or activities suddenly shift to nodes outside of their typical circle of interactions, a comparison of the current snapshot can easily be taken. This can be viewed against an older snapshot to understand deviations and new directions of activities.

The foregoing can be used to build or embody several example implementations, according to the teachings of the present specification. Some example implementations are included here as nonlimiting illustrations of these teachings.

In the present specification, there is disclosed an example of a computer-implemented method of providing contextual security for a user, comprising: enumerating a plurality of social connections for the user; building permissible data transfer profiles for a plurality of virtual groups; detecting an attempted data transfer to a social connection; and managing the attempted data transfer according to a permissible data transfer profile for a virtual group associated with the social connection.

There is further disclosed an example method, wherein enumerating the plurality of social connections comprises enumerating the social connections across a plurality of service connections.

There is further disclosed an example method, wherein the service connections comprise a connection selected from e-mail, enterprise chat, personal chat, short messaging service (SMS), file storage, file sharing, and social media.

There is further disclosed an example method, wherein a data transfer classifier is selected from a file name, file type, file source, uniform resource locator (URL) reputation, metadata, key words, natural language processing, optical character recognition, and voice recognition.

There is further disclosed an example method, wherein the social connections include group connections.

There is further disclosed an example method, further comprising assigning a social connection to more than one group according to a context.

There is further disclosed an example method, wherein the context includes a connection service.

There is further disclosed an example method, further comprising operating a computational learning engine to assign the social connections to a plurality of virtual groups, wherein the computational learning engine is configured to characterize data transfers to the virtual groups according to a data transfer classifier.

There is further disclosed an example method, further comprising receiving a training data set and training the computational learning engine with the training data set.

There is further disclosed an example method, wherein the computational learning engine is a neural network.

There is further disclosed an example method, wherein the training data set includes an initial virtual group.

There is further disclosed an example method, wherein the initial virtual group includes a data transfer restriction.

There is further disclosed an example method, further comprising maintaining the data transfer restriction after training.

There is further disclosed an example method, further comprising executing the claimed operation on a local device.

There is further disclosed an example method, wherein enumerating the plurality of social connections comprises enumerating all applications on a device.

There is further disclosed an example method, wherein enumerating the plurality of social connections comprises enumerating all applications on a device capable of network communications.

There is further disclosed an example method, further comprising offloading at least some claimed operations to a server device.

There is further disclosed an example method, wherein the permissible data transfer profiles include allow, block, and warn actions.

There is further disclosed an example method, wherein building the permissible data transfer profiles comprises accounting for second-order or higher connection information.

There is further disclosed an example method, further comprising crowdsourcing the second-order or higher connection information.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

There is also disclosed an example computing apparatus, comprising: a hardware platform comprising a processor and a memory; a network interface; a userspace application store comprising a plurality of userspace applications, wherein at least some of the userspace applications are programmed to communicate via the network interface; and instructions encoded within the memory to: enumerate social connections of a user via the userspace applications; assign the social connections to virtual groups according, at least in part, to correlated connection services; assign data transfer policies to the virtual groups; detect an attempted data transfer to a social connection; and enforce the data transfer policy for a virtual group of the social connection of the attempted data transfer.

There is further disclosed an example computing apparatus, wherein enumerating the social connections comprises enumerating the social connections across a plurality of service connections.

There is further disclosed an example computing apparatus, wherein the service connections comprise a connection selected from e-mail, enterprise chat, personal chat, short messaging service (SMS), file storage, file sharing, and social media.

There is further disclosed an example computing apparatus, wherein the instructions are further to select a data transfer classifier from a file name, file type, file source, uniform resource locator (URL) reputation, metadata, key words, natural language processing, optical character recognition, and voice recognition.

There is further disclosed an example computing apparatus, wherein the social connections include group connections.

There is further disclosed an example computing apparatus, wherein the instructions are further to assign a social connection to more than one group according to a context.

There is further disclosed an example computing apparatus, wherein the context includes a connection service.

There is further disclosed an example computing apparatus, wherein the instructions are further to operate an artificial intelligence module to assign the social connections to a plurality of virtual groups, wherein the artificial intelligence module is configured to characterize data transfers to the virtual groups according to a data transfer classifier.

There is further disclosed an example computing apparatus, wherein the instructions are to receive a training data set and to train the artificial intelligence module with the training data set.

There is further disclosed an example computing apparatus, wherein the artificial intelligence module is a neural network.

There is further disclosed an example computing apparatus, wherein the training data set includes an initial virtual group.

There is further disclosed an example computing apparatus, wherein the initial virtual group includes a data transfer restriction.

There is further disclosed an example computing apparatus, wherein the instructions are to maintain the data transfer restriction after training.

There is further disclosed an example computing apparatus, wherein the instructions are to execute the claimed operation on a local device.

There is further disclosed an example computing apparatus, wherein enumerating the social connections comprises enumerating all applications on a device.

There is further disclosed an example computing apparatus, wherein enumerating the social connections comprises enumerating all applications on a device capable of network communications.

There is further disclosed an example computing apparatus, wherein the instructions are further to offload at least some claimed operations to a server device.

There is further disclosed an example computing apparatus, wherein the data transfer policies include allow, block, and warn actions.

There is further disclosed an example computing apparatus, wherein assigning the data transfer policies comprises accounting for second-order or higher connection information.

There is further disclosed an example computing apparatus, wherein the instructions are to crowdsource the second-order or higher connection information.

There is also disclosed an example of one or more tangible, non-transitory computer-readable storage media having stored thereon executable instructions to: provide a machine learning environment; enumerate network communication-capable applications on a local device; enumerate a plurality of connection services available via the applications; identify a plurality of social connections correlated to at least one connection service; via the machine learning environment, assign the social connections to a plurality of connection groups, and build data sharing policies for the connection groups; intercept an attempt to share data via a virtual connection; and apply a data sharing policy of a connection group associated with the attempt, comprising at least one of allow, block, and warn.

There is further disclosed an example of one or more tangible, non-transitory computer-readable storage media, wherein enumerating the plurality of social connections comprises enumerating the social connections across a plurality of service connections.

There is further disclosed an example of one or more tangible, non-transitory computer-readable storage media, wherein the service connections comprise a connection selected from e-mail, enterprise chat, personal chat, short messaging service (SMS), file storage, file sharing, and social media.

There is further disclosed an example of one or more tangible, non-transitory computer-readable storage media, wherein the instructions are further to select a data transfer classifier from a file name, file type, file source, uniform resource locator (URL) reputation, metadata, key words, natural language processing, optical character recognition, and voice recognition.

There is further disclosed an example of one or more tangible, non-transitory computer-readable storage media, wherein the social connections include group connections.

There is further disclosed an example of one or more tangible, non-transitory computer-readable storage media, further comprising instructions to assign a social connection to more than one group according to a context.

There is further disclosed an example of one or more tangible, non-transitory computer-readable storage media, wherein the context includes a connection service.

There is further disclosed an example of one or more tangible, non-transitory computer-readable storage media, further comprising instructions to operate a computational learning engine to assign the social connections to a plurality of virtual groups, wherein the computational learning engine is configured to characterize data transfers to the virtual groups according to a data transfer classifier.

There is further disclosed an example of one or more tangible, non-transitory computer-readable storage media, further comprising instructions to receive a training data set and training the computational learning engine with the training data set.

There is further disclosed an example of one or more tangible, non-transitory computer-readable storage media, wherein the computational learning engine is a neural network.

There is further disclosed an example of one or more tangible, non-transitory computer-readable storage media, wherein the training data set includes an initial virtual group.

There is further disclosed an example of one or more tangible, non-transitory computer-readable storage media, wherein the initial virtual group includes a data transfer restriction.

There is further disclosed an example of one or more tangible, non-transitory computer-readable storage media, further comprising instructions to maintain the data transfer restriction after training.

There is further disclosed an example of one or more tangible, non-transitory computer-readable storage media, further comprising instructions to execute the claimed operation on a local device.

There is further disclosed an example of one or more tangible, non-transitory computer-readable storage media, wherein enumerating the plurality of social connections comprises enumerating all applications on a device.

There is further disclosed an example of one or more tangible, non-transitory computer-readable storage media, wherein enumerating the plurality of social connections comprises enumerating all applications on a device capable of network communications.

There is further disclosed an example of one or more tangible, non-transitory computer-readable storage media, further comprising instructions to offload at least some claimed operations to a server device.

There is further disclosed an example of one or more tangible, non-transitory computer-readable storage media, wherein the data sharing policies include allow, block, and warn actions.

There is further disclosed an example of one or more tangible, non-transitory computer-readable storage media, wherein building the data sharing policies comprises accounting for second-order or higher connection information.

There is further disclosed an example of one or more tangible, non-transitory computer-readable storage media, wherein the instructions are to crowdsource the second-order or higher connection information.

A system and method for providing contextual data security will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram illustration of a security ecosystem 100. In the example of FIG. 1, security ecosystem 100 may be an enterprise, a government entity, a data center, a telecommunications provider, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, including one or more social media users 184, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the Internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a stand-alone Internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include functionality to control other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120 or social media user 184, a hardware-based attack on client device 110, modifying storage 150 (or volatile memory), modifying client application 112 (which may be running in memory), or gaining access to local resources.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120 and/or social media users 184. Thus, one aim of attacker 180 may be to install his malware on one or more client devices 110. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device.

Buffer overruns may be the result, for example, of poor input validation or use of insecure libraries, and in many cases arise in nonobvious contexts. Thus, although not malicious, a developer contributing software to an application repository may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the Global Threat Intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
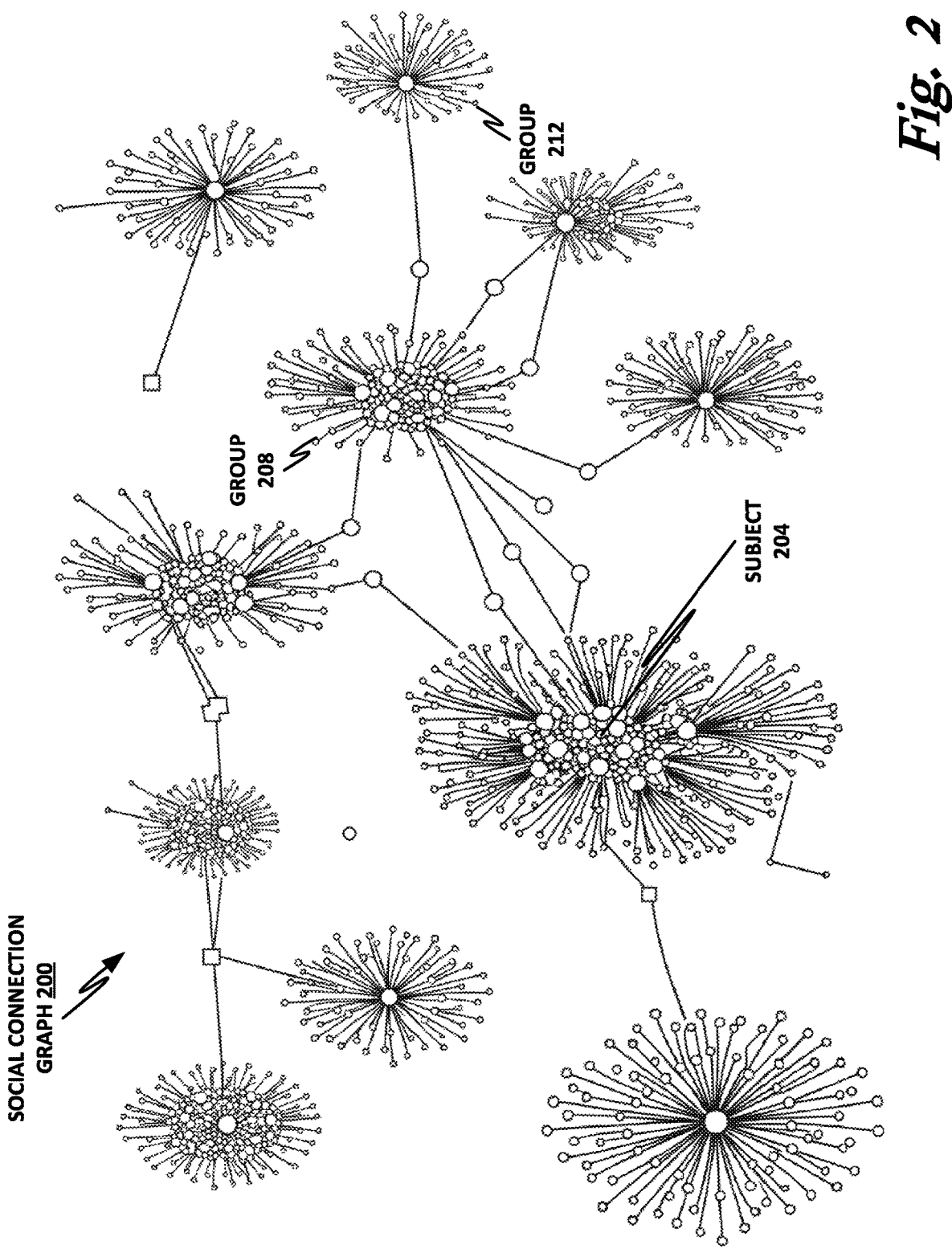
FIG. 2 is a social connection graph illustrating social connections of a subject.

FIG. 2 is a social connection graph 200 illustrating social connections of a subject. In this case, subject 204 operates a computing device, which has access to a number of services that provide communications. These services may include, by way of illustrative and nonlimiting example, e-mail, enterprise chat services, personal chat services, short messaging service (SMS), file storage services, filesharing services, peer-to-peer filesharing services, social media platforms, and similar. Via these services, subject 204 may have both direct and indirect connections to a number of third parties and groups. In this example, groups are illustrated as clusters of connections. As illustrated, subject 204 has direct connections to group 208. For example, subject 204 may be a member of group 208, may have associates within group 208, may be connected or affiliated with group 208, or may otherwise be associated with group 208. Subject 204 does not have a direct connection to group 212. However, via group 208, subject 204 may have second or third-order connections to group 212. In other words, although subject 204 is not directly a member of or affiliated with group 212, subject 204 may associate or be friends with people in group 208 who are also members of, connected with, or who have direct connections to group 212.

Note that subject 204 may or may not be a direct member of group 208. However, subject 204 has social connections with members of group 208, and those social connections may have security implications that are influenced by the nature and membership of group 208.

Figure 3:
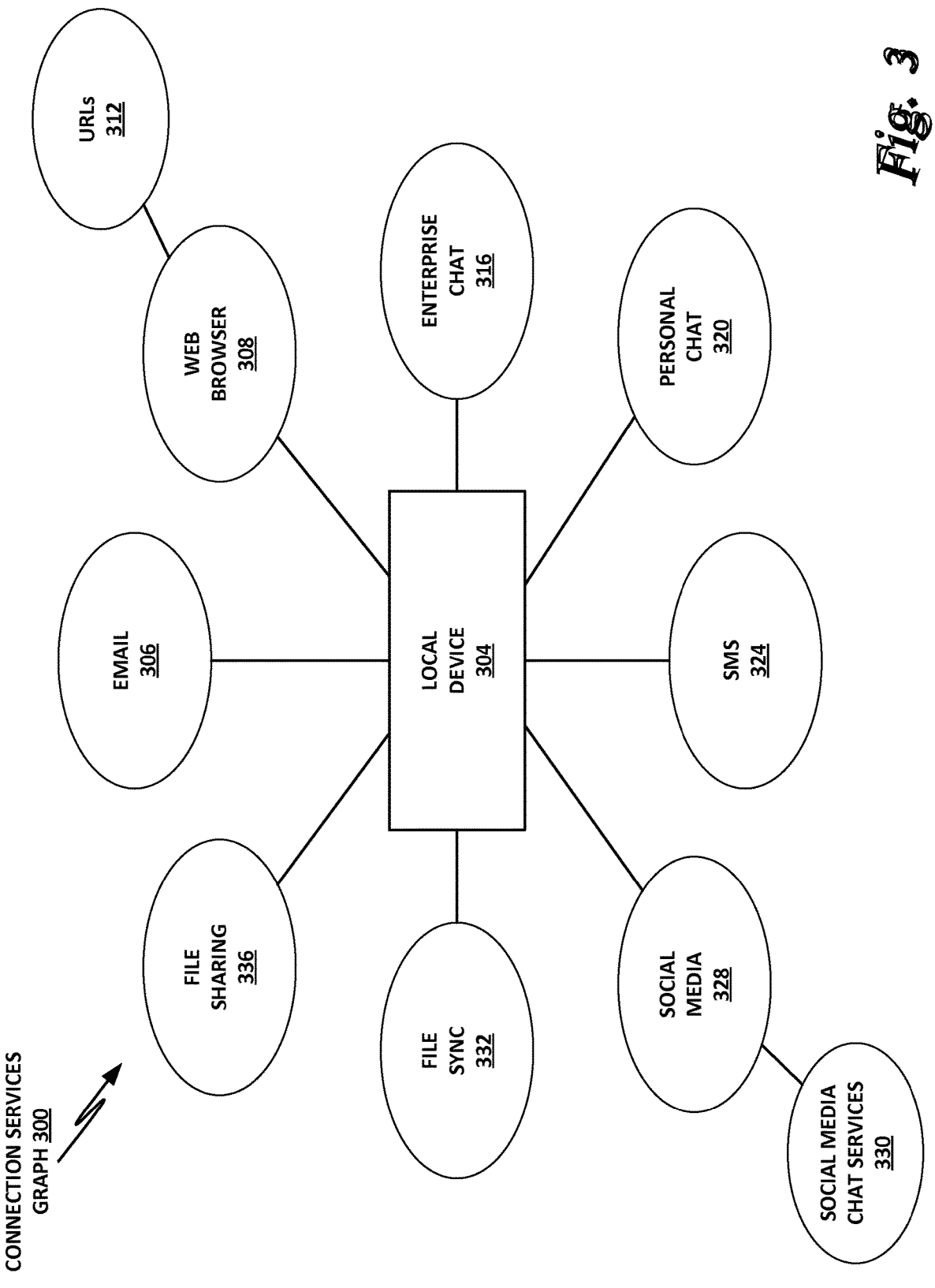
FIG. 3 is a block diagram illustration of a connection services graph.

FIG. 3 is a block diagram illustration of a connection services graph 300. Connection services graph 300 illustrates a local device 304, by which a user may access certain services. These services include, by way of illustrative and nonlimiting example, e-mail 306, web browser 308, by which the user may access uniform resource locators (URLs) 312, enterprise chat 316, personal chat 320, SMS 324, social media 328, by which the user may access social media chat services 330, file synchronization or backup service 332, and filesharing service 336, which could be, for example, a cloud-based filesharing service, a peer-to-peer filesharing service, or similar.

These services provide a way by which a user of local device 304 may interact or communicate with other users, and/or transfer data. A data transfer may include, for example, a transfer of a file or other binary object, or it could also include simply a message that may contain information that is shared with another user. Communicating and sharing information are desirable in many contexts, and it is therefore desirable for users to have access to a local device 304, with access to many services by which the user may communicate with other users and share information or data. However, from a security standpoint, and for example in an enterprise context, it may be desirable to limit the ability of a user to share information via one or more services, either by limiting data transfer on the service itself, or by limiting data transfer to certain groups on the service. Such limitations can be manually configured, but manually configuring such limitations may be difficult and time-consuming. This would require an administrator to enumerate all of the contacts for the user of local device 304, determine all of the interfaces or services by which the user may communicate with those contacts, characterize each contact, define groups, and manually define policies for each group, contact, or service. With more than a few users, this can become a prohibitively difficult activity, particularly in an enterprise context.

Figure 4:
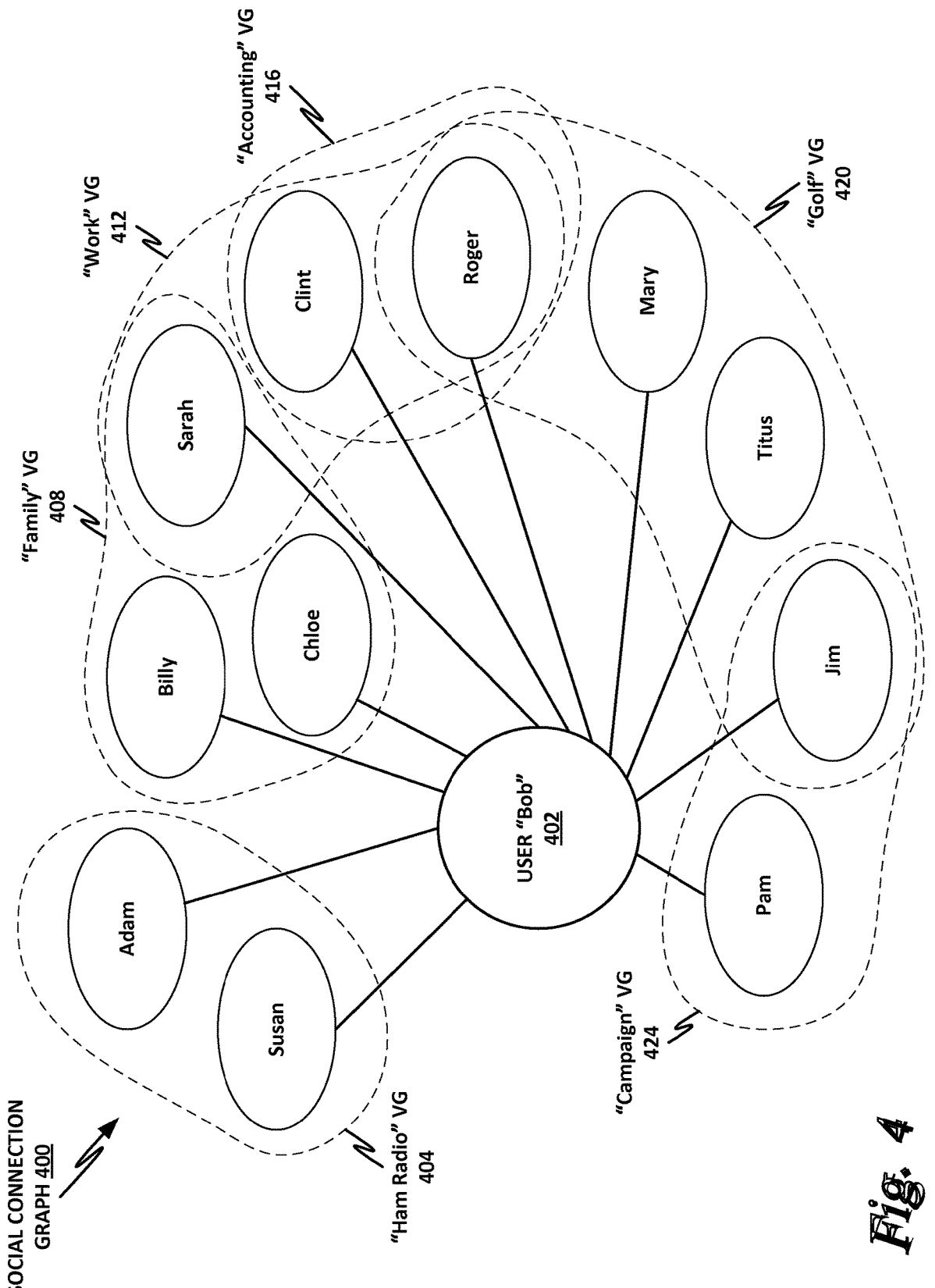
FIG. 4 illustrates various social connections in a social connection graph.

FIG. 4 illustrates various social connections in a social connection graph 400. In this example, user "Bob" labeled 402 has a number of social connections. For illustrative purposes, these social connections have been manually assigned to certain groups. As will be evident in the description, these groups may share some overlap. For example, Bob is active in his local ham radio club. His contacts Adam and Susan are also active in the ham radio club, and thus may be assigned to ham radio virtual group (VG) 404. Note that social connection graph 400 does not identify the specific interfaces or services by which Bob communicates with Susan and Adam, or with the other users listed. A social connection graph such as social connection graph 400 may be conceptually agnostic of the interfaces or connection services. However, in practice, it may be useful to enumerate different connections or services by which users communicate, and these enumerations may influence data transfer policies.

For example, in the case of ham radio VG 404, Bob may communicate with Adam and Susan via shortwave radio (which in this illustration, is not regulated by a system of the present specification), and via e-mail. E-mail may be subject to regulation by a system of the present specification, and in this example, may be deemed the most common method by which Adam and Susan communicate with Bob, and vice versa. Thus, certain species or classes of data transfer may be allowed from Bob to Adam or Susan, via e-mail.

Also within Bob's social network graph are his wife, Sarah, and his children, Billy and Chloe. In this example, Bob is in the accounting group of a company, while Sarah works for the same company and is an engineer. Thus, Bob and Sarah may have multiple connections via multiple services. Bob and Sarah may communicate via phone, e-mail, SMS, social media, and others.

Because Billy and Chloe are teenagers, they communicate only via SMS. Seriously, they literally only communicate via SMS. If Bob asked Billy or Chloe at the dinner table how their day was, the most you'll get out of them is a surly, "fine." Thus, any communication between Bob and Billy or Chloe that does not occur over SMS may be considered out of the ordinary.

Sarah, Billy, and Chloe all belong to the family VG 408. Within the context of family VG 408, there may be policies for the types of data that are normally transferred between Bob, Sarah, Billy, and Chloe. For example, Bob and Sarah may share recipes and cute little love notes over their personal e-mail, but it would be uncommon for them to share marketing materials or sensitive enterprise data over personal e-mail instead of enterprise e-mail. Bob and Sarah may also share information via an enterprise chat application, an enterprise social networking platform, or similar.

Sarah, Clint, and Roger all work at the same company as Bob, and thus belong to the "work" VG 412. Within work VG 412, it may be common to share certain types of information. For enterprise security purposes, sharing information between employees of the same company is considered normal and relatively safe. Because Sarah, Clint, Roger, and Bob are all employees of the same company, and share fiduciary duties and confidentiality obligations to the company, it is safe for Bob to share sensitive or proprietary work information via ordinary enterprise channels such as enterprise e-mail, enterprise chat, or similar.

However, Clint and Roger are members of the "accounting" VG 416, while Sarah is not a member of the accounting VG. Thus, while it may be permissible for Bob to share, for example, a purchase order with Sarah via enterprise e-mail, it would be unusual because Sarah's engineering work does not ordinarily require her to access purchase orders. Thus, if Bob sends an e-mail to Sarah and attaches a purchase order, while it may not be a breach of enterprise security policy, it may be flagged as a potential error or mistake. For example, Bob may have been trying to send the purchase order to his secretary, Sally, and when he typed an "S" into the "to:" field of his e-mail application, the autofill function filled in Sarah instead of Sally. A system of the present specification may catch this error and warn Bob before sending the e-mail. In this particular example, while no sensitive enterprise data may have been leaked, there are other situations where a more serious error could occur. For example, if Bob was trying to send the purchase order to his secretary, Sally, by typing an S into the "to:" field, and the autofill function instead filled in Steve, who is a member of the accounting department at a competing company, a serious data leak could occur.

In addition to being Bob's friend in the accounting VG, Roger is also Bob's golf buddy in "golf" VG 420, which further includes Bob's other golf buddies Mary, Titus, and Jim. When discussing golf (such as setting up a tee time), it may be common and relatively acceptable for Bob to use his enterprise e-mail address as a matter of convenience. In this case, attaching sensitive information to an e-mail would not be a problem if the e-mail goes only to Roger. But if Bob sends a group e-mail to Roger, Mary, Titus, and Jim, there may be more serious security implications. Furthermore, even if Bob does not attach a file to the group e-mail, what he says could have enterprise security implications. For example, Bob might shoot off a group e-mail to Roger, Mary, Titus, and Jim mentioning that he will miss their regular Thursday tee time because, "I'm really under the gun. We've got to finish this big proposal that's due on Friday." If Mary, for example, is an astute observer, she may be able to deduce information about what Bob's company is working on by the timing of the proposal and the context clues that Bob gives her in the e-mail. Thus, a system of the present specification could employ natural language processing to warn Bob that his proposed e-mail could represent a data leak, even though he is not attaching any data. Alternatively, Bob could send out an e-mail that simply says, "Sorry, guys. I'm going to have to miss our regular Thursday tee time. I've got some stuff to finish up at work." In this case, the e-mail says nothing except that Bob is busy, which is the ordinary and expected state for American employees. An even better e-mail might say, "Sorry, guys. I'll have to miss Thursday's tee time. I'll catch you next week."

Bob is also the campaign finance manager for a candidate for the state legislature, running with the party that you, the reader, personally prefer. Jim is the candidate's chief of staff, while Pam is an intern working in the campaign finance department for free.

Pam and Jim both belong to the "campaign" VG 424. As before, this VG may have certain expected channels of communication and data loss policies. For example, it may be undesirable or even unethical for Bob to use his personal or enterprise e-mail for campaign functions, and thus he may be provided an e-mail address by the campaign itself. He may also use SMS and phone calls to communicate with Pam and Jim. In this illustration, Roger is the campaign finance manager for the opposing candidate for the state legislative office.

Thus, although Roger is a member of work VG 412, accounting VG 416, and golf VG 420, it would be erroneous for Bob or Jim to share any campaign details with Roger. Thus, there may be certain data that are expected to be shared with campaign VG 424, via channels commonly used for campaign VG 424, which are different from those used for Bob to communicate with Roger. Thus, there may be certain data transfer policies associated with campaign VG 424 that prevent leakage of campaign-sensitive data from Bob to others, including Roger.

As discussed above, crafting detailed VGs with detailed group policies for each VG manually could be cumbersome and time prohibitive. It is advantageous to use automated systems, such as a machine learning environment, to identify certain VGs, and to identify what types of data transfers or communications are considered "normal" between members of those groups, and to manage those interactions or data transfers accordingly.

Figure 5:
FIG. 5 is a block diagram illustration of a client device.

FIG. 5 is a block diagram illustration of a client device 500. Client device 500 could be an endpoint device, such as a laptop or desktop computer, an enterprise server, an enterprise gateway, or some other device found within an enterprise. In common practice, client device 500 may have substantially fewer computing resources available than a large server bank in a data center. It may, therefore, be desirable to offload some compute functions—especially heavy-duty compute functions—to a more capable device. However, client device 500 may include sufficient capabilities to perform some analysis.

Client device 500 includes a hardware platform 504, a network interface 508, an operating system 512, an application store 516, an artificial intelligence (AI) module 520, a social connection management engine 524, and a connection policy store 528. Examples of hardware platforms with processors and memories are disclosed in further detail below.

Network interface 508 provides communication services to communicatively couple client device 500 to external devices via a network.

Operating system 512 may be any suitable server, desktop, and/or mobile operating system. For example, operating system 512 could be an Apple iOS operating system, Android, Windows, UNIX, Linux, OS X, or similar.

Depending on the nature of client device 400, operating system 512 could also be an embedded or real-time operating system.

Application store 516 includes a number of client applications and other programs that may provide connections to services or to communication media. These can include, for example, a web browser, social media connections, SMS, e-mail, message boards, software utilities for syncing and sharing files, or other media for sharing data.

Figure 13:
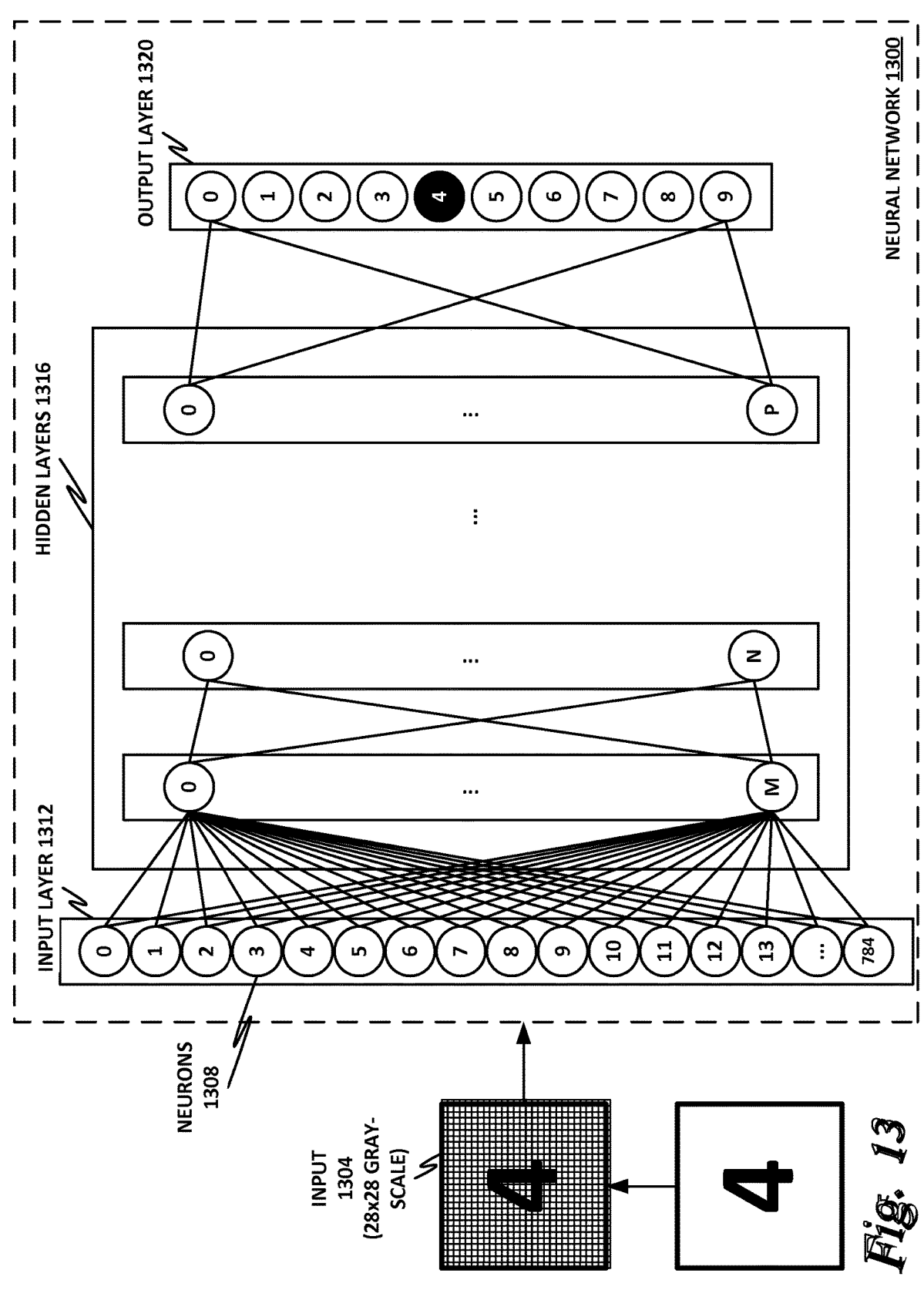
FIG. 13 illustrates machine learning according to a "textbook" problem with real-world applications.
Figure 14:
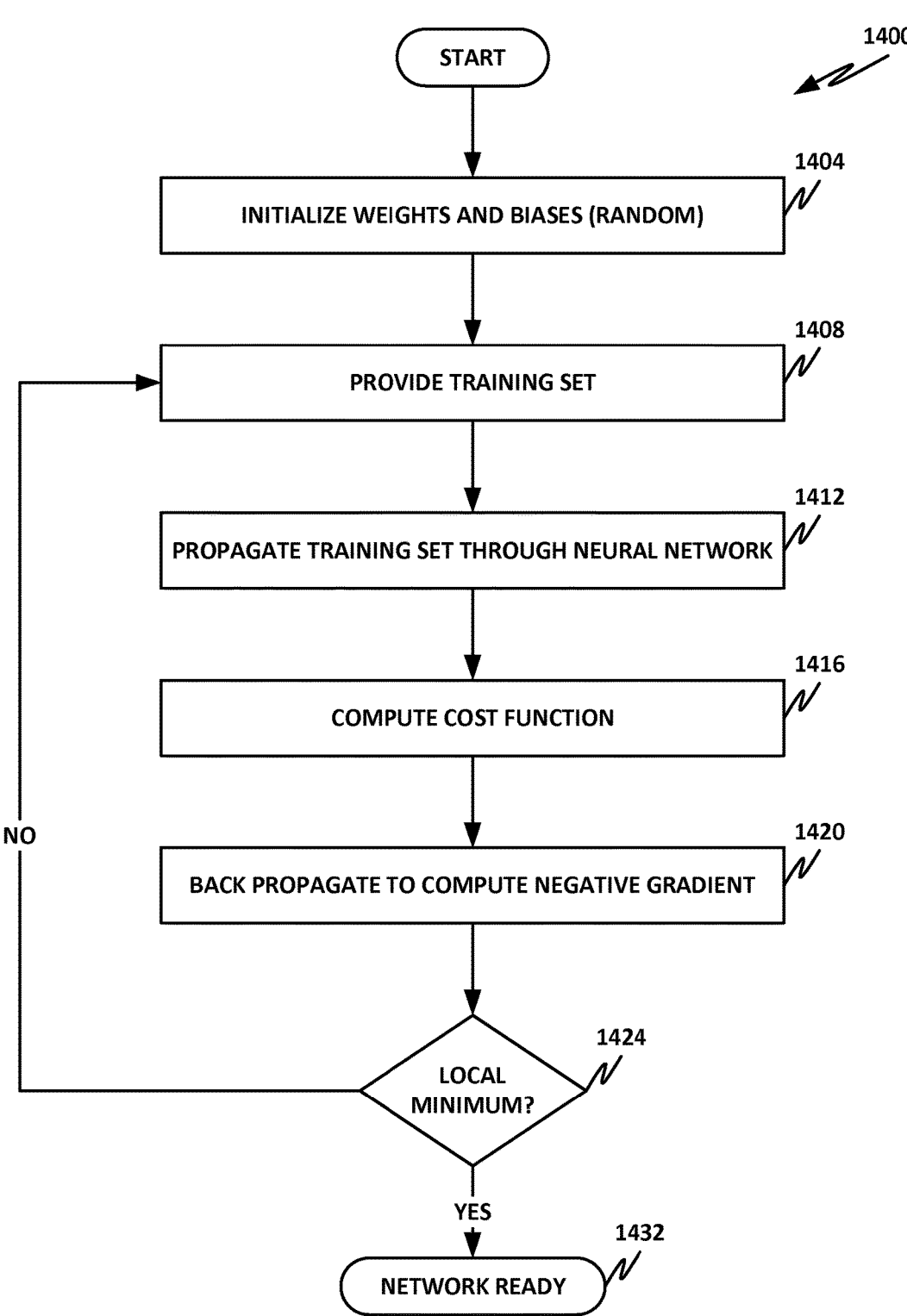
FIG. 14 is a flowchart of a method that may be used to train a neural network.
Figure 15:
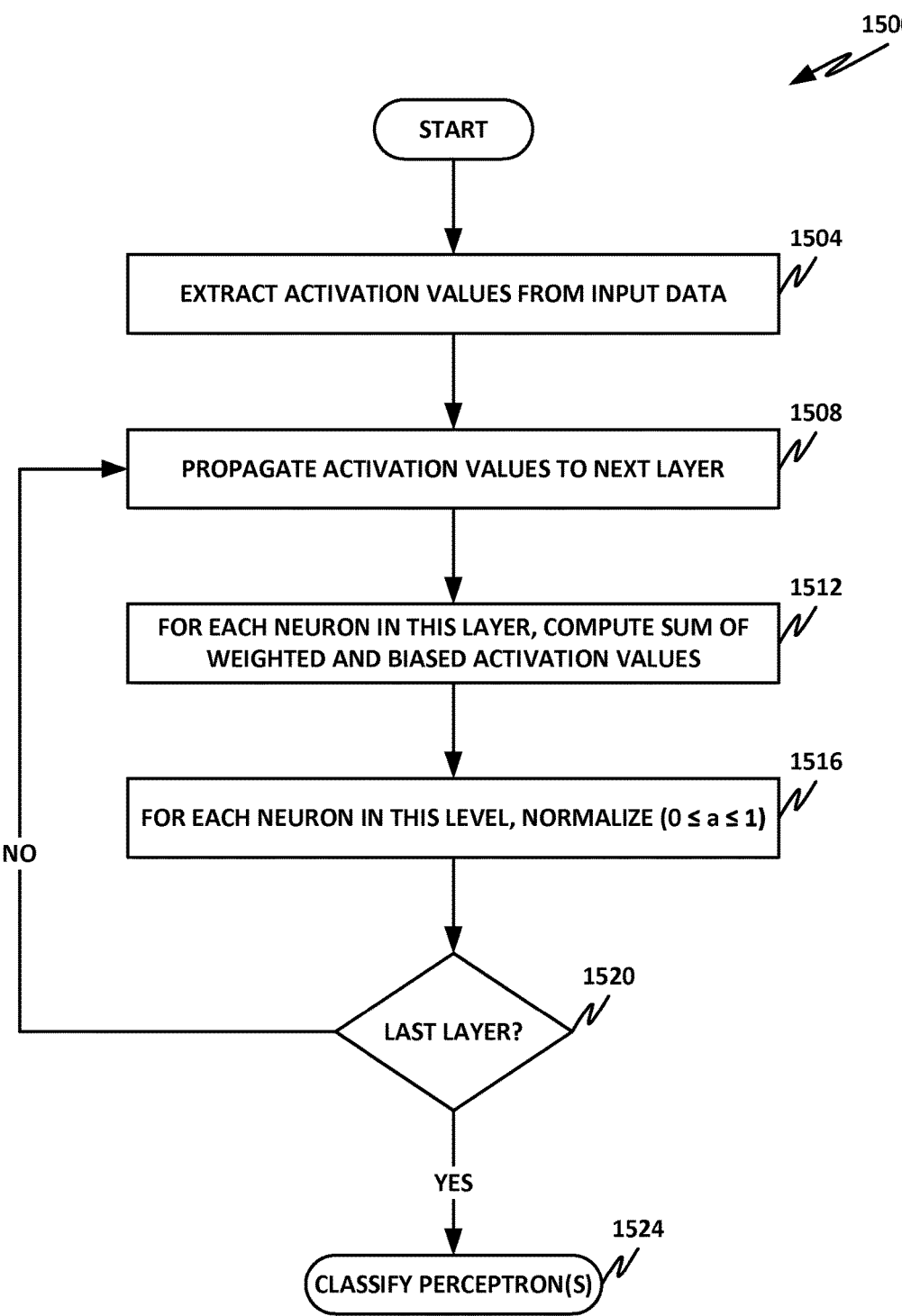
FIG. 15 is a flowchart of a method of using a neural network to classify an object.
Figure 16:
FIG. 16 is a block diagram of selected elements of an analyzer engine.

AI module 520 implements an artificial intelligence engine as illustrated in FIG. 16, below. AI module 520 may implement an AI algorithm. Many AI algorithms are known, and an illustrative AI infrastructure is illustrated in FIGS. 13-15. However, other AI algorithms could be used to achieve the results of the present specification.

In some cases, AI module 520 may include a pre-trained model that has been previously trained on a data set. In some cases, this may include existing VGs, and known policies for those VGs. For example, AI module 520 may be pre-trained with training data. This could include policies such as banning certain interactions or data transfers on certain interfaces. For example, a training data set could include a policy that any object or document traceable to an enterprise file storage database is not to be transferred outside of the enterprise via certain mechanisms.

This could also include certain subclasses of documents or objects from the enterprise file storage database, or it could include objects with certain markers or metadata, such as those that are marked as confidential, proprietary, classified, top-secret, or similar.

As AI module 520 observes continuing interactions on client device 500, it may further refine its model. However, in some cases, forbidden interactions in the initial training data set may remain forbidden, even in light of certain usage.

Social connection management engine 524 may be configured to receive virtual groups from AI module 520, and to craft policies for those virtual groups based on expected or permissible usage for those groups. These policies may be stored in connection policy store 528. Thereafter, when an application within application store 516 attempts to initiate an interaction or a data transfer with an external connection, social connection management engine 524 may identify a VG for the interaction, retrieve an appropriate policy from connection policy store 528, and enforce the policy.

Figure 6:
FIG. 6 is a block diagram illustration of a security server.

FIG. 6 is a block diagram illustration of a security server 600. Security server 600 may be hosted, for example, in an enterprise data center, in a cloud data center, or in any other hardware or software environment. Security server 600 provides a hardware platform 604, which may provide compute resources such as processors, memories, storage, accelerators, and similar.

Although it is not required, in common usage (particularly in the case of a data center), hardware platform 604 need not necessarily be a standalone computer. Rather, hardware platform 604 could be a blade server, a rackmount server, or some other architecture.

In this illustration, a host operating system 608 is provided. Host operating system 608 could provide, for example, virtualization or containerization of resources for hardware platform 604.

Within guest infrastructure 612, various guests are allocated. In this example, these are shown as separate or distinct guests, although the divisions are a matter of skill in the art, and divisions different from those shown may be used.

In this case, crowdsourcing engine 616 may be used to crowdsource information about certain connections. This is useful, because a single end user client device, such as client device 500 of FIG. 5, may not have a global view into broader interactions. For example, as illustrated in FIG. 2, a subject may have certain direct connections, but may not have insight into second-order or other indirect connections. The crowdsourcing engine can gather crowdsourced information about groups, users, virtual groups, and second and higher-order connections, to identify the risks associated with sharing certain types of data with certain groups. Crowdsourced information can then be used to update an AI engine on a client device with more rich data than would be available to the client device by itself.

Machine reputation engine 620 may include a global reputation store that assigns reputations to certain networks, objects, connections, groups, VGs, or similar. For example, MCAFEE, LLC operates the Global Threat Intelligence (GTI™) database, which includes global-scale reputations for certain URLs. This could provide one input into a model. Other types of reputations could also be used, and may be useful to provide up-to-date information to client devices.

Machine learning engine 624 may include a machine learning model that can be trained to observe certain types of interactions. In some cases, machine learning engine 624 may be used to provide a training data set to, for example, AI module 520 of FIG. 5. Furthermore, information collected from machine learning engine 624 could also be used to update the model, or to further enrich the model.

Client model store 628 may optionally provide a cloud-based or network storage for models of certain client devices. This can provide a generic training model that may be used to initialize client devices, but could also include updated client models, which may include information from a model after it has been trained on a particular system. Not only can this provide backup or storage of the model, which may prevent the need to retrain the model from scratch if it is lost, but it can also provide consistency across devices. For example, a user may operate a desktop computer, a laptop computer, a tablet, a smart phone, and other devices. By having a cloud-based model that has been trained on all of these devices, the user can enjoy a consistent experience across multiple devices.

Furthermore, individual devices need not have their own AI modules. In some cases, metadata can simply be uploaded to the cloud and security server 600 operating machine learning engine 624 may characterize connections and craft policies for users and devices. Those policies can then be exported to individual client devices, which can use these in a manner similar to static access control lists or sharing policies. This could also provide a mixed environment. For example, a desktop or laptop computer may be more capable than a smartphone or a tablet computer. Thus, an AI module running on the desktop or laptop computer may create the policies using AI, and then those policies can be exported to other, less capable devices.

Figure 7:
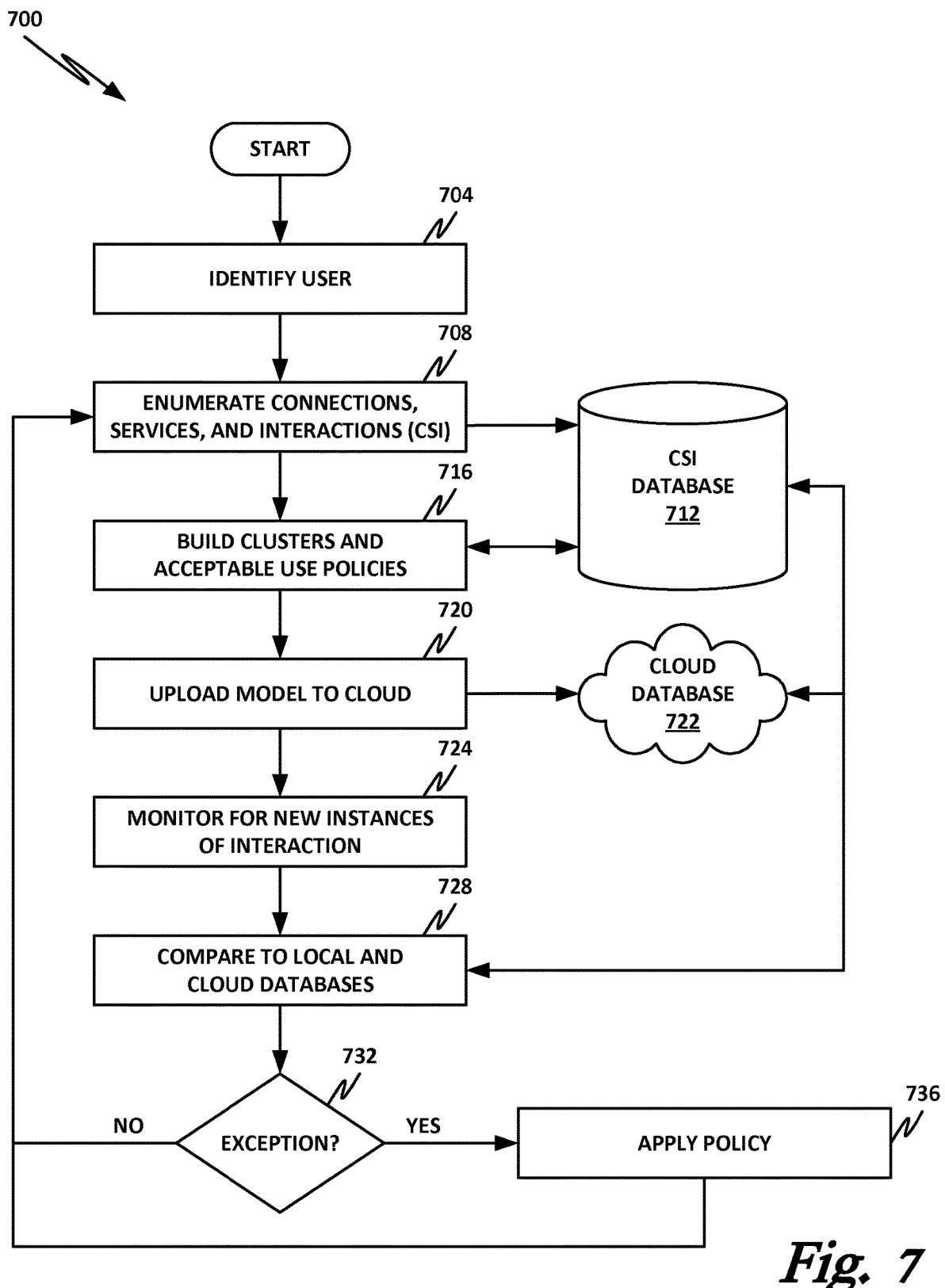
FIG. 7 is a flowchart of a method.

FIG. 7 is a flowchart of a method 700. The method of flowchart 700 may be used on a local client device or on a server, or certain operations may be split between a server and a local client device, as appropriate to a particular embodiment.

Starting in block 704, the system initially identifies the user. For example, the user may log in, and based on the login credentials, the user may be identified and policies for that particular user may be loaded. The user may be identified across multiple platforms and applications, including the user as currently logged on to the operating system, the user's identity on certain client applications, and on web applications.

In block 708, a security agent may enumerate connections, services, and interactions (CSI). This may include taking interaction inventory. The system agent may draw connections between the current user and other users or organizations that they interact with. Connections may be established statically in some embodiments, such as by analyzing historical records, e-mails, social media exchanges, and similar. Connections may also be enumerated dynamically and, for example, may be event-based. The collected information may be stored in a database labeled here as CSI database 712. Table 1 below provides a visual representation of some example interactions for CSI database 712.

TABLE 1

| Example Interactions | | | |
| --- | --- | --- | --- |
| (Source User) | (Destination User) | Resource | Interaction |
| <Current User> | <Sarah@internal.com> | Net Buyer | Upload: Receipt.pdf |
| <Bob@internal.com> | <Current User> | Net Buyer | Download: Budget.xls |
| <Current User> | <Larry@recruiter.com> | LinkedIn | Upload: JobPost.docx |
| . . . | | | |

In block 716, accessing CSI database 712, the system builds clusters and acceptable use policies. For example, a local system agent may use collected information to cluster database records, to find patterns within the interaction. This could include, for example, a static analysis, or it could also include an artificial intelligence engine such as a neural network.

In building and clustering database records, several types of interactions may be used. These could include, for example, user to user, user to resource, user to interaction, or resourced interaction.

For example, the agent may learn that office documents are shared between the current user and sarah@internal.com over the "net buyer" resource.

Similarly, the current user shares office documents with Larry over the LinkedIn resource. The system does not necessarily make judgments on whether these interactions are appropriate. Enterprise usage policies may be the original foundation for which types of interactions or data sharing are appropriate. The function of the AI engine may be to determine which types of interactions or data transfers are more common than others, and to characterize them as such. Note also that the AI model may be pre-trained with certain training data that may be based on enterprise security policy. However, it is expected that the AI model will evolve as new data transfer or interaction instances occur.

In block 720, the local model may be shared to cloud database 722 to allow for a cloud-based solution to find additional connections. Thus, when the user comes into contact with additional users, there may already be some existing profiles and/or reputations associated with those existing users or groups that are new to the user. This can provide a baseline acceptable use policy through contexts that were previously established by other users.

The result of blocks 704, 708, 716, and 720 is that interactions have been characterized, and can now be monitored for enforcement purposes.

In block 724, once the baseline has been established, then the system is monitored for new instances of interactions. This monitoring is both for enforcement purposes, and to further refine the model as new interactions are observed. Thus, the system dynamically monitors for new interactions, and then compares those new interactions against the existing model, for example, as stored in CSI database 712.

In block 728, the system compares interactions to the local and cloud databases, as appropriate, to determine what policy to apply to the interaction. A trigger may be applied when an interaction crosses a defined threshold or tolerance, which may represent, for example, how "unusual" the interaction is relative to other interactions on the system. For example, the following interaction may occur:

TABLE 2

| Unusual Interaction | | | |
| --- | --- | --- | --- |
| (Source User) | (Destination User) | Resource | Interaction |
| <Larry@recruiter.com> | <Current User> | LinkedIn | Download: Candidate.docx |

This interaction may be flagged as unusual, because it is unusual for Larry, a recruiter, to share .jar files via LinkedIn.

In decision block 732, if an exception occurs, then in block 736, the appropriate policy may be applied. For example, depending on the severity or the unusualness of the action, the action may be blocked, the user may be warned, an enterprise security administrator could be notified, or other action could be taken.

Returning to decision block 732, if there is no exception (e.g., the current interaction is ordinary within a threshold), then control returns to block 708, and the model is continually refined and the system continually monitored while the system is running.

Figure 8:
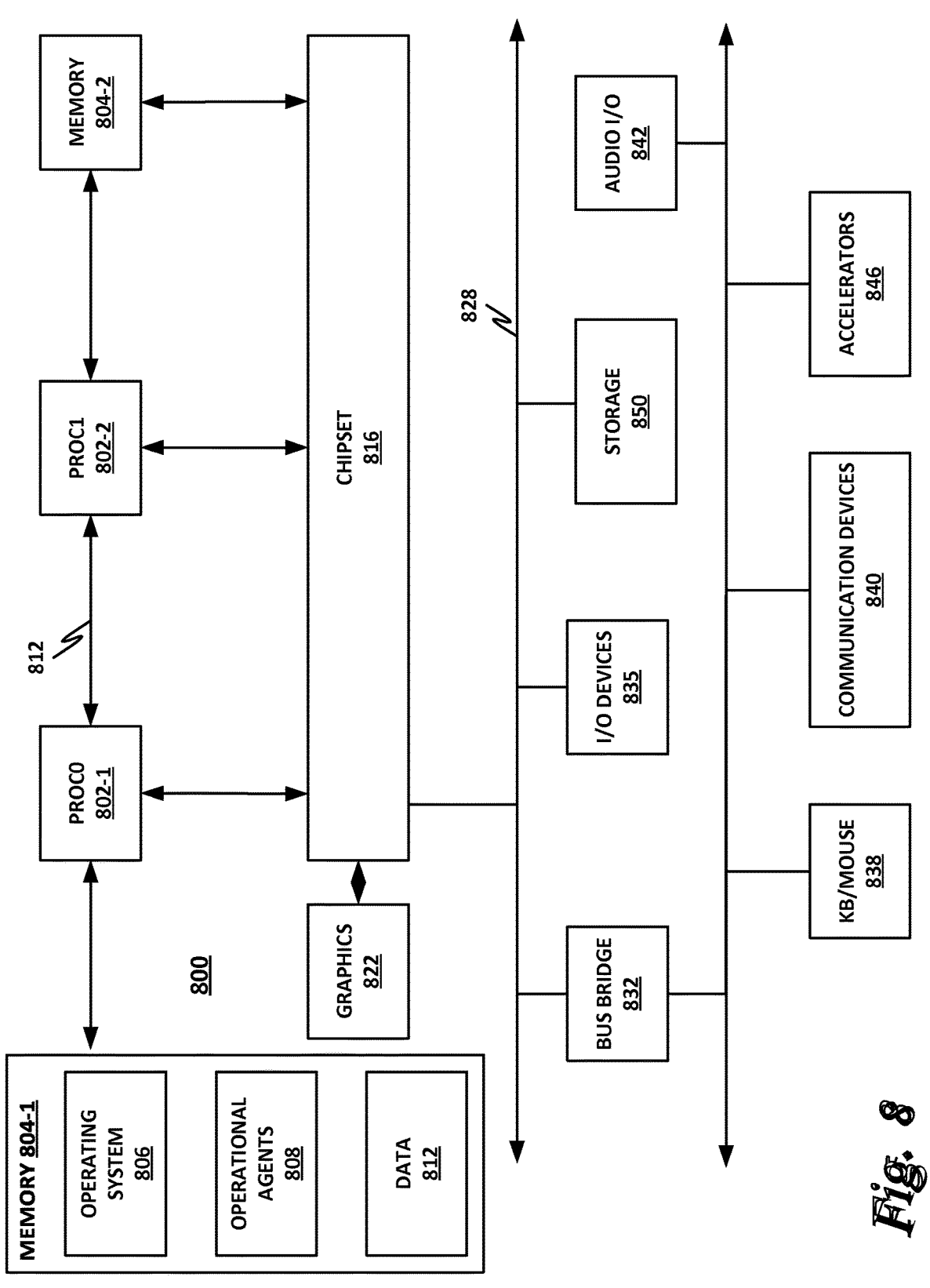
FIG. 8 is a block diagram of selected elements of a hardware platform.

FIG. 8 is a block diagram of a hardware platform 800. In at least some embodiments, hardware platform 800 may be programmed, configured, or otherwise adapted to provide contextual data security, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high-performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
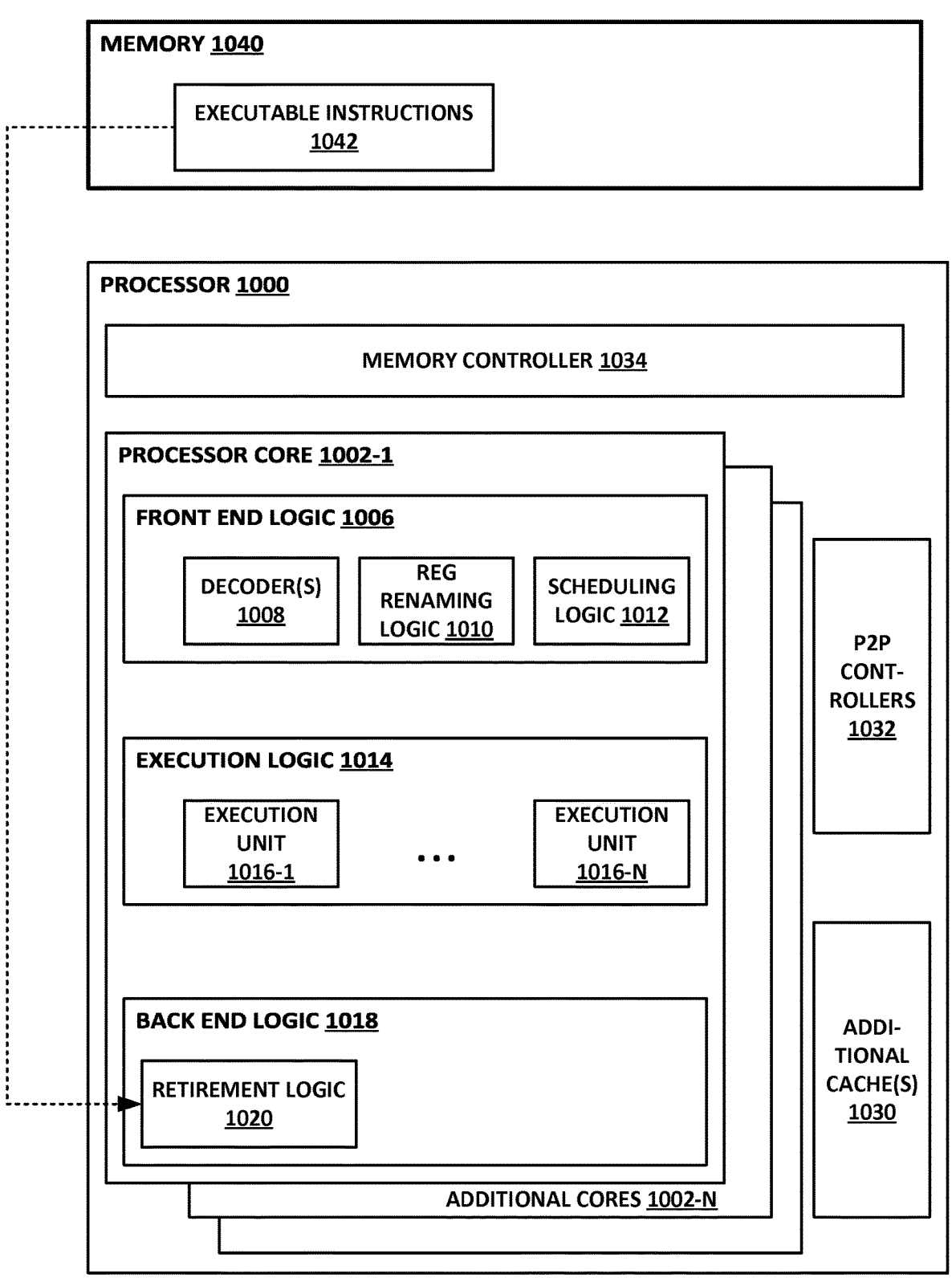
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high-performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPUs).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency non-volatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 800 may be virtualized, in particular the processor (s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
FIG. 9 is a block diagram of selected elements of a system-on-a-chip (SoC).

FIG. 9 is a block diagram illustrating selected elements of an example SoC 900. In at least some embodiments, SoC 900 may be programmed, configured, or otherwise adapted to provide contextual data security, according to the teachings of the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902-1 and 902-2. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) director 928, a suitable power control 930, a dynamic RAM (DRAM) 932, and flash 934. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 900 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. In at least some embodiments, processor 1000 may be programmed (including via microcode), configured, or otherwise adapted to provide contextual data security, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via NFV, and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VMs) are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Memory 1040 may include executable instructions 1042, as illustrated. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

Figure 11:
FIG. 11 is a block diagram of selected elements of a network function virtualization (NFV) infrastructure.

FIG. 11 is a block diagram of a network function virtualization (NFV) infrastructure 1100. FIG. 11 illustrates a platform for providing virtualization services. Virtualization may be used in some embodiments to provide one or more features of the present disclosure.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
FIG. 12 is a block diagram of selected elements of a containerization infrastructure.
Figure 12:

FIG. 12 is a block diagram of selected elements of a containerization infrastructure 1200. FIG. 12 illustrates a platform for providing containerization services. Containerization may be used in some embodiments to provide one or more features of the present disclosure. Like virtualization, containerization is a popular form of providing a guest infrastructure.

Containerization infrastructure 1200 runs on a hardware platform such as containerized server 1204. Containerized server 1204 may provide a number of processors, memory, one or more network interfaces, accelerators, and/or other hardware resources.

Running on containerized server 1204 is a shared kernel 1208. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1208 is main operating system 1212. Commonly, main operating system 1212 is a Unix or Linux-based operating system, although containerization infrastructure is also available for other types of systems, including Microsoft Windows systems and Macintosh systems. Running on top of main operating system 1212 is a containerization layer 1216. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1212 may also include a number of services 1218, which provide services and interprocess communication to userspace applications 1220.

Services 1218 and userspace applications 1220 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1212, they inherit the same file and resource access permissions as those provided by shared kernel 1208. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun-up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1204, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1204).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1204 hosts two containers, namely container 1230 and container 1240.

Container 1230 may include a minimal operating system 1232 that runs on top of shared kernel 1208. Note that a minimal operating system is provided as an illustrative example, and is not mandatory. In fact, container 1230 may perform as full an operating system as is necessary or desirable. Minimal operating system 1232 is used here as an example simply to illustrate that in common practice, the minimal operating system necessary to support the function of the container (which in common practice, is a single or monolithic function) is provided.

On top of minimal operating system 1232, container 1230 may provide one or more services 1234. Finally, on top of services 1234, container 1230 may also provide a number of userspace applications 1236, as necessary.

Container 1240 may include a minimal operating system 1242 that runs on top of shared kernel 1208. Note that a minimal operating system is provided as an illustrative example, and is not mandatory. In fact, container 1240 may perform as full an operating system as is necessary or desirable. Minimal operating system 1242 is used here as an example simply to illustrate that in common practice, the minimal operating system necessary to support the function of the container (which in common practice, is a single or monolithic function) is provided.

On top of minimal operating system 1242, container 1240 may provide one or more services 1244. Finally, on top of services 1244, container 1240 may also provide a number of userspace applications 1246, as necessary.

Using containerization layer 1216, containerized server 1204 may run a number of discrete containers, each one providing the minimal operating system and/or services necessary to provide a particular function. For example, containerized server 1204 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

FIGS. 13-15 illustrate selected elements of an artificial intelligence system or architecture. In these FIGURES, an elementary neural network is used as a representative embodiment of an artificial intelligence or machine learning architecture or engine. This should be understood to be a nonlimiting example, and other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 13 illustrates machine learning according to a "textbook" problem with real-world applications. In this case, a neural network 1300 is tasked with recognizing characters.

To simplify the description, neural network 1300 is tasked only with recognizing single digits in the range of 0 through 9. These are provided as an input image 1304. In this example, input image 1304 is a 28×28-pixel 8-bit grayscale image. In other words, input image 1304 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1300 are illustrated in this FIGURE, and that real-world applications may be more complex, and may include additional features. Additional layers of complexity or functions may be provided in a neural network, or other artificial intelligence architecture, to meet the demands of a particular problem. Indeed, the architecture here is sometimes referred to as the "Hello World" problem of machine learning, and is provided here as but one example of how the machine learning or artificial intelligence functions of the present specification could be implemented.

In this case, neural network 1300 includes an input layer 1312 and an output layer 1320. In principle, input layer 1312 receives an input such as input image 1304, and at output layer 1320, neural network 1300 "lights up" a perceptron that indicates which character neural network 1300 thinks is represented by input image 1304.

Between input layer 1312 and output layer 1320 are some number of hidden layers 1316. The number of hidden layers 1316 will depend on the problem to be solved, the available compute resources, and other design factors. In general, the more hidden layers 1316, and the more neurons per hidden layer, the more accurate the neural network 1300 may become. However, adding hidden layers and neurons also increases the complexity of the neural network, and its demand on compute resources. Thus, some design skill is required to determine the appropriate number of hidden layers 1316, and how many neurons are to be represented in each hidden layer 1316.

Input layer 1312 includes, in this example, 784 "neurons" 1308. Each neuron of input layer 1312 receives information from a single pixel of input image 1304. Because input image 1304 is a 28×28 grayscale image, it has 784 pixels. Thus, each neuron in input layer 1312 holds 8 bits of information, taken from a pixel of input layer 1304. This 8-bit value is the "activation" value for that neuron.

Each neuron in input layer 1312 has a connection to each neuron in the first hidden layer in the network. In this example, the first hidden layer has neurons labeled 0 through M. Each of the M+1 neurons is connected to all 784 neurons in input layer 1312. Each neuron in hidden layer 1316 includes a kernel or transfer function, which is described in greater detail below. The kernel or transfer function determines how much "weight" to assign each connection from input layer 1312. In other words, a neuron in hidden layer 1316 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1316, until they reach the last layer, which has P+1 neurons labeled 0 through P. Each of these P+1 neurons has a connection to each neuron in output layer 1320. Output layer 1320 includes a number of neurons known as perceptrons that compute an activation value based on their weighted connections to each neuron in the last hidden layer 1316. The final activation value computed at output layer 1320 may be thought of as a "probability" that input image 1304 is the value represented by the perceptron. For example, if neural network 1300 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1316 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a nontrivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (a) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma\left(w_0 a_0^{(0)} + w_1 a_1^{(0)} + \cdots \, w_{783} a_{783}^{(0)} + b\right)$$

In this case, it is assumed that layer 0 (input layer 1312) has 784 neurons. Where the previous layer has "n" neurons, the function can be generalized as:

$$a_0^{(1)} = \sigma\left(w_0 a_0^{(0)} + w_1 a_1^{(0)} + \cdots \, w_n a_n^{(0)} + b\right)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} w_{0,0} & \cdots & w_{0,n} \\ \cdots & \ddots & \cdots \\ w_{(k,0)} & \cdots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)} = \sigma\left(W a^{(0)} + b\right)$$

Neural connections and activation values are propagated throughout the hidden layers 1316 of the network in this way, until the network reaches output layer 1320. At output layer 1320, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1320 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, IT, and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights and biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 14 is a flowchart of a method 1400. Method 1400 may be used to train a neural network, such as neural network 1300 of FIG. 13.

In block 1404, the network is initialized. Initially, neural network 1300 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1408, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1408, the initial training set is provided to the neural network. Alternatively, the full training set could be used in each iteration.

In block 1412, the training data are propagated through the neural network. Because the initial values are random, and are therefore essentially garbage, it is expected that the output will also be a garbage value. In other words, if neural network 1300 of FIG. 13 has not been trained, when input image 1304 is fed into the neural network, it is not expected with the first training set that output layer 1320 will light up perceptron 4. Rather, the perceptrons may have values that are all over the map, with no clear winner, and with very little relation to the number 4.

In block 1416, a cost function is computed as described above. For example, in neural network 1300, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1420, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1424, the system determines whether it has reached a local minimum (e.g., whether the gradient has reached 0 within the threshold). If the local minimum has not been reached, then the neural network has not been adequately trained, and control returns to block 1408 with a new training set. The training sequence continues until, in decision block 1424, a local minimum has been reached.

Now that a local minimum has been reached and the corrections have been back-propagated, in block 1432, the neural network is ready.

FIG. 15 is a flowchart of a method 1500. Method 1500 illustrates a method of using a neural network, such as network 1300 of FIG. 13, to classify an object.

In block 1504, the network extracts the activation values from the input data. For example, in the example of FIG. 13, each pixel in input image 1304 is assigned as an activation value to a neuron 1308 in input layer 1312.

In block 1508, the network propagates the activation values from the current layer to the next layer in the neural network. For example, after activation values have been extracted from the input image, those values may be propagated to the first hidden layer of the network.

In block 1512, for each neuron in the current layer, the neuron computes a sum of weighted and biased activation values received from each neuron in the previous layer. For example, in the illustration of FIG. 13, neuron 0 of the first hidden layer is connected to each neuron in input layer 1312. A sum of weighted values is computed from those activation values, and a bias is applied.

In block 1516, for each neuron in the current layer, the network normalizes the activation values by applying a function such as sigmoid, ReLU, or some other function.

In decision block 1520, the network determines whether it has reached the last layer in the network. If this is not the last layer, then control passes back to block 1508, where the activation values in this layer are propagated to the next layer.

Returning to decision block 1520, If the network is at the last layer, then the neurons in this layer are perceptrons that provide final output values for the object. In terminal 1524, the perceptrons are classified and used as output values.

FIG. 16 is a block diagram of an analyzer engine 1604. Analyzer engine 1604 may be configured to provide analysis services, such as via a neural network. FIG. 16 illustrates a platform for providing analysis services. Analysis, such as neural analysis and other machine learning models, may be used in some embodiments to provide one or more features of the present disclosure.

Note that analyzer engine 1604 is illustrated here as a single modular object, but in some cases, different aspects of analyzer engine 1604 could be provided by separate hardware, or by separate guests (e.g., virtual machines or containers) on a hardware system, or in a distributed system.

Analyzer engine 1604 includes an operating system 1608. Commonly, operating system 1608 is a Linux operating system, although other operating systems, such as Microsoft Windows, Mac OS X, or similar could be used. Analyzer engine 1604 also includes a Python interpreter 1612, which can be used to run Python programs. A Python module known as Numerical Python (NumPy) is often used for neural network analysis, and advantageously provides libraries that simplify operations, such as linear algebra library that understands compact vector notation. Although Python+NumPy is a popular choice, other non-Python or non-NumPy-based systems may also be used. For example, a neural network could be implemented in Matrix Laboratory (MATLAB), C, C++, Fortran, R, or some other compiled or interpreted computer language.

GPU array 1624 may include an array of graphics processing units that may be used to carry out the computation functions of neural network 1628. Note that GPU arrays are a popular choice for this kind of processing, but neural networks can also be implemented in CPUs, or in ASICs or FPGAs that are specially designed to implement the neural network.

Neural network 1628 includes the actual code for carrying out the neural network. FIGS. 13-15 above provide an illustrative architecture and algorithm for providing a neural network. It should be understood that neural networks, including CNNs, are only one example of a machine learning algorithm, which falls into the more general category of "Artificial Intelligence." In some embodiments, neural network 1628 could be replaced or supplemented by symbolic learning (including for example robotics or computer vision), or other machine learning algorithms such as pattern recognition, statistical learning, speech recognition, natural language processing, deep learning, recurrent neural networks, or object recognition. Furthermore, in a machine learning system, the learning may be supervised or unsupervised, depending on the context and the requirements of a particular embodiment.

Results interpreter 1632 may include logic separate from the neural network functions that can be used to operate on the outputs of the neural network to assign the object for particular classification, perform additional analysis, and/or provide a recommended remedial action. For example, results interpreter 1632 may compare activation values of perceptrons to thresholds, provide mutual exclusivity between perceptrons, assign objects multinominal classifiers according to activation values, format outputs, drive a user interface, provide human-readable reports, or perform other work on the outputs of neural network 1628.

Objects database 1636 may include a database of known objects and their classifications. Neural network 1628 may initially be trained on objects within objects database 1636, and as new objects are identified, objects database 1636 may be updated with the results of additional neural network analysis. In some cases, feedback may be incorporated so that the results of neural network 1628 can be improved over time.

Once final results have been obtained, the results may be sent to an appropriate destination via network interface 1620.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and an NVM. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile RAM (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:
a hardware platform comprising a processor circuit and a memory;
a network interface;
a plurality of userspace applications stored in the memory, wherein at least some of the userspace applications are programmed to communicate via the network interface; and
instructions encoded within the memory to:
enumerate social media connections of a user via the userspace applications, wherein the social media connections comprise connections to social media platforms or chat services;
use a machine learning algorithm to determine a plurality of virtual groups that the social media connections belong to according, at least in part, to correlated connection services, and to determine acceptable data transfer policies for the plurality of virtual groups according to types of data that the machine learning algorithm determines are commonly shared with the virtual groups;
select, from the acceptable data transfer policies, a data transfer policy for an attempted data transfer to a social media connection, wherein the attempted data transfer comprises a message with an attachment, wherein selecting is based on a virtual group that the social media connection belongs to, and content of the attachment; and
enforce the selected data transfer policy.

2. The computing apparatus of claim 1, wherein enumerating the social media connections comprises enumerating the social media connections across a plurality of service connections.

3. The computing apparatus of claim 2, wherein the service connections comprise a connection selected from e-mail, enterprise chat, personal chat, short messaging service (SMS), file storage, file sharing, and social media.

4. The computing apparatus of claim 1, wherein the instructions are further to select a data transfer classifier from a file name, file type, file source, uniform resource locator (URL) reputation, metadata, key words, natural language processing, optical character recognition, and voice recognition.

5. The computing apparatus of claim 1, wherein the social media connections include group connections.

6. The computing apparatus of claim 1, wherein the instructions are further to assign a social connection to more than one group according to a context.

7. The computing apparatus of claim 6, wherein the context includes a connection service.

8. The computing apparatus of claim 1, wherein the instructions are further to operate an artificial intelligence module to assign the social media connections to a plurality of virtual groups, wherein the artificial intelligence module is configured to characterize data transfers to the virtual groups according to a data transfer classifier.

9. The computing apparatus of claim 8, wherein the instructions are to receive a training data set and to train the artificial intelligence module with the training data set.

10. The computing apparatus of claim 9, wherein the artificial intelligence module is a neural network.

11. The computing apparatus of claim 9, wherein the training data set includes an initial virtual group.

12. The computing apparatus of claim 11, wherein the initial virtual group includes a data transfer restriction.

13. The computing apparatus of claim 12, wherein the instructions are to maintain the data transfer restriction after training.

14. One or more tangible, non-transitory computer-readable storage media having stored thereon executable instructions to:
  provide a machine learning environment;
  enumerate network communication-capable applications on a local device;
  enumerate a plurality of social media connection services available via the network communication-capable applications, wherein the social media connection services comprise social media platforms or chat services;
  identify a plurality of social media connections for a user of the local device, correlated to at least one social media connection service;
  use the machine learning environment to assign the social media connections to a plurality of connection groups based at least in part on connection services that provide the social media connections, and determine acceptable data sharing policies for the connection groups according to types of data that the machine learning environment determines are commonly shared in the connection groups;
  intercept an attempt to share data via a connection service, wherein the attempt to share data comprises sending a message with an attachment; and
  apply a data sharing policy of a connection group associated with the attempt comprising selecting the data sharing policy based on the connection group and a content of the attachment.

15. The one or more tangible, non-transitory computer-readable storage media of claim 14, further comprising a local device to execute the executable instructions.

16. The one or more tangible, non-transitory computer-readable storage media of claim 14, wherein enumerating the plurality of social media connections comprises enumerating all applications on a device capable of network communications.

17. The one or more tangible, non-transitory computer-readable storage media of claim 14, further comprising instructions to offload at least some instructions to a server device.

18. A computer-implemented method of providing contextual security for a user, comprising:
  enumerating a plurality of social media accounts for the user based on accounts of the user to access social media platforms or chat services;
  operating a machine learning algorithm to determine permissible data transfer profiles for a plurality of social media connection virtual groups based at least in part on connection services that provide the social media accounts, assigning the social media accounts to the social media connection virtual groups, wherein the permissible data transfer profiles are based on types of data that the machine learning algorithm determines are commonly shared via the social media accounts;
  detecting an attempted data transfer via a social media account, wherein the attempted data transfer comprises a message with an attachment; and
  managing the attempted data transfer according to a permissible data transfer profile for a social media connection virtual group of the social media account, and a content of the attachment.

19. The method of claim 18, wherein building the permissible data transfer profiles comprises accounting for second-order or higher connection information.

20. The method of claim 19, further comprising crowd-sourcing the second-order or higher connection information.

* * * * *